United States Patent
Kawatani (10) Patent No.: US 7,200,802 B2
(45) Date of Patent: Apr. 3, 2007

(54) EVALUATING DISTINCTIVENESS OF DOCUMENT

(75) Inventor: Takahiko Kawatani, Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 10/460,469

(22) Filed: Jun. 13, 2003

(65) Prior Publication Data

US 2004/0006736 A1  Jan. 8, 2004

(30) Foreign Application Priority Data

Jul. 4, 2002 (JP) ............................. 2002-195375

(51) Int. Cl.
*G06F 17/21* (2006.01)
(52) U.S. Cl. ..................................... 715/500
(58) Field of Classification Search ................ 715/500, 715/511; 707/6
See application file for complete search history.

(56) References Cited

U.S. PATENT DOCUMENTS

| 5,943,443 | A * | 8/1999 | Itonori et al. ................ 707/6 |
| 5,943,670 | A * | 8/1999 | Prager ............................ 707/6 |
| 6,178,420 | B1 * | 1/2001 | Sassano ......................... 707/6 |
| 6,757,646 | B2 * | 6/2004 | Marchisio ...................... 704/9 |
| 6,850,937 | B1 * | 2/2005 | Hisamitsu et al. ............. 707/6 |
| 2002/0156763 | A1 * | 10/2002 | Marchisio ...................... 707/1 |
| 2005/0021517 | A1 * | 1/2005 | Marchisio ...................... 707/4 |

OTHER PUBLICATIONS

G. Salton et al., Automatic Text Structuring and Summarization, *Advances in Automatic Text Summarization*, The MIT Press, 1999, pp. 341-355.
I. Mani and E. Bloedorn, Summarizing Similarities and Differences Among Related Documents, *Advances in Automatic Text Summarization*, The MIT Press, 1999, pp. 356-379.
K. McKeown and D.R. Radev, Generating Summaries of Multiple News Articles, *Advances in Automatic Text Summarization*, The MIT Press, 1999, pp. 382-389.

* cited by examiner

*Primary Examiner*—Doug Hutton (57) ABSTRACT

Two document sets are compared in natural language processing and the distinctiveness of each constituent element (such as a sentence, term or phrase) of one document set is evaluated by dividing both the target and comparison documents into document segments, constructing the sentence vector of each document segment whose components are the occurring frequencies of terms occurring in the document segment, and projecting all the sentence vectors of both the documents on a projection axis to find a projection axis which maximizes a ratio equal to: (squared sum of projected values originating from the target document)/(squared sum of projected values originating from the comparison document). Projected values are obtained by projecting the sentence vectors on the projection axis, and the degrees of distinctiveness of the individual sentences of the target document are calculated on the basis of the projected values.

18 Claims, 6 Drawing Sheets

Target Document
D

| 1 | |
|---|---|
| : | |
| k | k-th document |
| M | |

FIG. 5A k-th sentence vector $$\mathbf{d}_k = (d_{k1}, d_{k2}, \text{--}, d_{ki}, \text{--}, d_{kj})^T$$

$$= (0, 3, 0, \text{--}, 2, \text{--}, 1, 0)^T$$

FIG. 5B

Comparison Document
T

| | |
|---|---|
| 1 | |
| : | |
| k | k-th document |
| N | |

FIG. 5C k-th sentence vector $$t_k = (t_{k1}, t_{k2}, \text{--}, t_{ki}, \text{--}, t_{kj})^T$$

$$= (1, 1, 0, \text{--}, 2, \text{--}, 0, 1)^T$$

FIG. 5D

EVALUATING DISTINCTIVENESS OF DOCUMENT

BACKGROUND OF THE INVENTION

1. Field of the Invention

The present invention relates to natural language processing which includes document summarization. More particularly, the present invention relates to quantitatively evaluating the degree of distinctiveness of a constituent element (such as a sentence, term or phrase) of one of two documents or document sets that have been compared, thereby enhancing the performance of the natural language processing.

2. Description of the Related Art

A process in which two documents or document sets are compared so as to extract the different parts between them is important in multi-document summarization. With regard to the following discussion, the document from which the different parts are extracted shall be called the "target document", while the other document with which the target document is compared shall be called the "comparison document". It has heretofore been a common practice to divide both the target document and the comparison document into small elements, and to collate the resulting elements and to identify the elements having no correspondence, as the different parts. The element can be a sentence, a paragraph, and each individual domain in the case where the document has been divided at the change points of topics extracted automatically. In such a case, vector space models are often employed for the collation of the elements. In a case where each element is represented by a vector space model, the components of the vector correspond to individual terms occurring in the document, and the frequency of the corresponding term in the element, or a quantity associated therewith is given as the value of each of the vector components.

The cosine similarity between the vectors can be employed for judging whether the correspondence between the elements is good or bad. The elements are judged to correspond to each other when the cosine similarity is higher than a predetermined threshold. Accordingly, an element of the target document whose similarities to all of the elements of the comparison document are less than the threshold is regarded as the different part. In another known method, after both documents have been represented by graphs, the corresponding relationships of graph elements are found so as to obtain the different parts from the graph elements having no correspondence.

There are two techniques for the extraction of the different parts:
(A) Extracting any part in which expressed information differs.
(B) Extracting any part that reflects a difference of concepts expressed in the documents by both documents.

Many prior-art methods of multi-document summarization are based on technique (A). The different parts between both the documents are extracted, and the importance of each different part in the target document is not evaluated. Consequently, a part that is not very important as information can be extracted as the different part merely because the part differs from the comparison document. From technique (B), the present invention makes possible the extraction of any different part that satisfies the following conditions:

The different part extracted from the target document is also an important part in the target document. That is, the difference and importance balance. The different part satisfying this condition is more appropriately expressed as a "distinctive part" in the target document, rather than merely the different part. Therefore, a different part satisfying this condition shall be hereinafter called the "distinctive part".

An evaluation value can be calculated as to the extent of distinctiveness for each sentence of the target document.

An evaluation value can be calculated as to the degrees of distinctiveness of terms or term series for the extracted distinctive part so as to identify what term or term series forms a main factor.

SUMMARY OF THE INVENTION

One method of evaluating a degree of distinctiveness of a target document that satisfies the above-noted conditions is as follows. One embodiment in accordance with the present invention is a method of extracting document segments having high degrees of distinctiveness from within the target document. First, both the target document and a comparison document are divided into document segments, and a vector of each document segment whose components are the frequencies of terms occurring in the document segment is obtained. Since the most natural document segment is a sentence, the document segment is assumed to be a sentence hereinafter. Thus, both the documents are represented as sets of sentence vectors. Subsequently, there is found a projection axis which maximizes a ratio (squared sum of projected values originating from the target document)/(squared sum of projected values originating from the comparison document) when all the sentence vectors of both the documents are projected on a certain projection axis. Regarding such a projection axis, the squared sum of the projected values of the sentence vectors of the target document becomes large, whereas the squared sum of the projected values of the sentence vectors of the comparison document becomes small. Therefore, information that exists to a great extent in the target document and that barely exists in the comparison document is reflected. As a result, when the sentence vectors are projected on the projection axis, the absolute values of the projected values become large in the target document for sentences that differ in contents from the comparison document, and they can be adopted as the base of the calculation of the degrees of distinctiveness of the individual sentences of the target document.

Another embodiment in accordance with the present invention is a method of selecting terms having a high degree of distinctiveness. Regarding such terms, the correlations between the frequencies of a target term in individual sentences and the degrees of distinctiveness of the respective sentences are calculated, and any term having a high correlative value is selected. Since such a term should occur only in sentences having a high degree of distinctiveness, such a term can be regarded as a distinctive term. Accordingly, the degree of distinctiveness of the term is calculated on the basis of the correlative value.

The degrees of distinctiveness of term series, such as phrases or patterns, occurring in the target document can be evaluated by a method similar to the method used for sentences or terms. By way of example, a vector in which its components corresponding to terms contained in a target term series take a value "1", whereas its other components take a value "0" is obtained for each term series, and the degree of distinctiveness of each term series can be calculated by the method employed for calculating the sentence degree of distinctiveness. Alternatively, when the frequencies of each term series in individual sentences are calculated beforehand, the degree of distinctiveness of the term series can be evaluated by replacing the frequencies of each term with those of each term series in the method employed for calculating the term degree of distinctiveness.

Furthermore, a method of evaluating the degree of distinctiveness of a target document in accordance with another embodiment of the present invention is as follows. A sentence is assumed to be a document segment. The processing steps up to the obtaining of the vectors of the document segments are the same as the above-noted embodiment. Thereafter, a similarity to the whole target document and a similarity to the whole comparison document are calculated for each sentence of the target document. Any important sentence in the target document has a high degree of similarity to the entire target document, and any sentence having a content of which differs from that of the comparison document has a low degree of similarity to the entire comparison document. Therefore, a degree of distinctiveness in which difference and importance are well balanced can be defined by employing a ratio (similarity to the entire target document)/(similarity to the entire comparison document). Furthermore, the degree of distinctiveness of a term can be calculated by calculating the correlations between the degrees of distinctiveness of individual sentences and the frequencies of the term in the respective sentences. Also, the degree of distinctiveness of each term series can be calculated by obtaining a vector from the term series and then calculating the similarities of the vector to the entire target document and to the entire comparison document as in the above-noted embodiment. Alternatively, the degree of distinctiveness of each term series can be calculated from the correlations between the frequencies of the term series in individual sentences and the degrees of distinctiveness of the respective sentences.

According to the present invention, when two documents are compared, the degrees of distinctiveness can be calculated for individual sentences, phrases or words that constitute a target document that is one of the two documents. In a case where a comparison document is the other document and both the comparison document and the target document are, for example, newspaper accounts stating an identical case, sentences having high degrees of distinctiveness are selected from the target document, and accordingly, sentences stating topics different from those of the comparison document can be identified. For example, in a case where, regarding a certain traffic accident, the "outline of the accident" and the "assailant and victim" are stated in the comparison document, while the "view of the police", etc. are stated in addition to the "outline of the accident" in the target document, the degrees of distinctiveness of sentences concerning the "view of the police" are high in the target document, and a part associated with the "view of the police" can be identified. If a user has already looked over the comparison document, he/she is permitted to identify and read only the part of the "view of the police" unknown to him/her. Thus, the efficiency of the acquisition of information can be enhanced. When the target document and the comparison document are the respective sets of replies from a certain population and from another population in a survey, the tendency of distinctive replies in the population of the target document can be grasped by applying a method in accordance with an embodiment of the present invention. In this manner, owing to the application of the present invention, information from the target document can be easily identified and analyzed.

DETAILED DESCRIPTION

Figure 1:
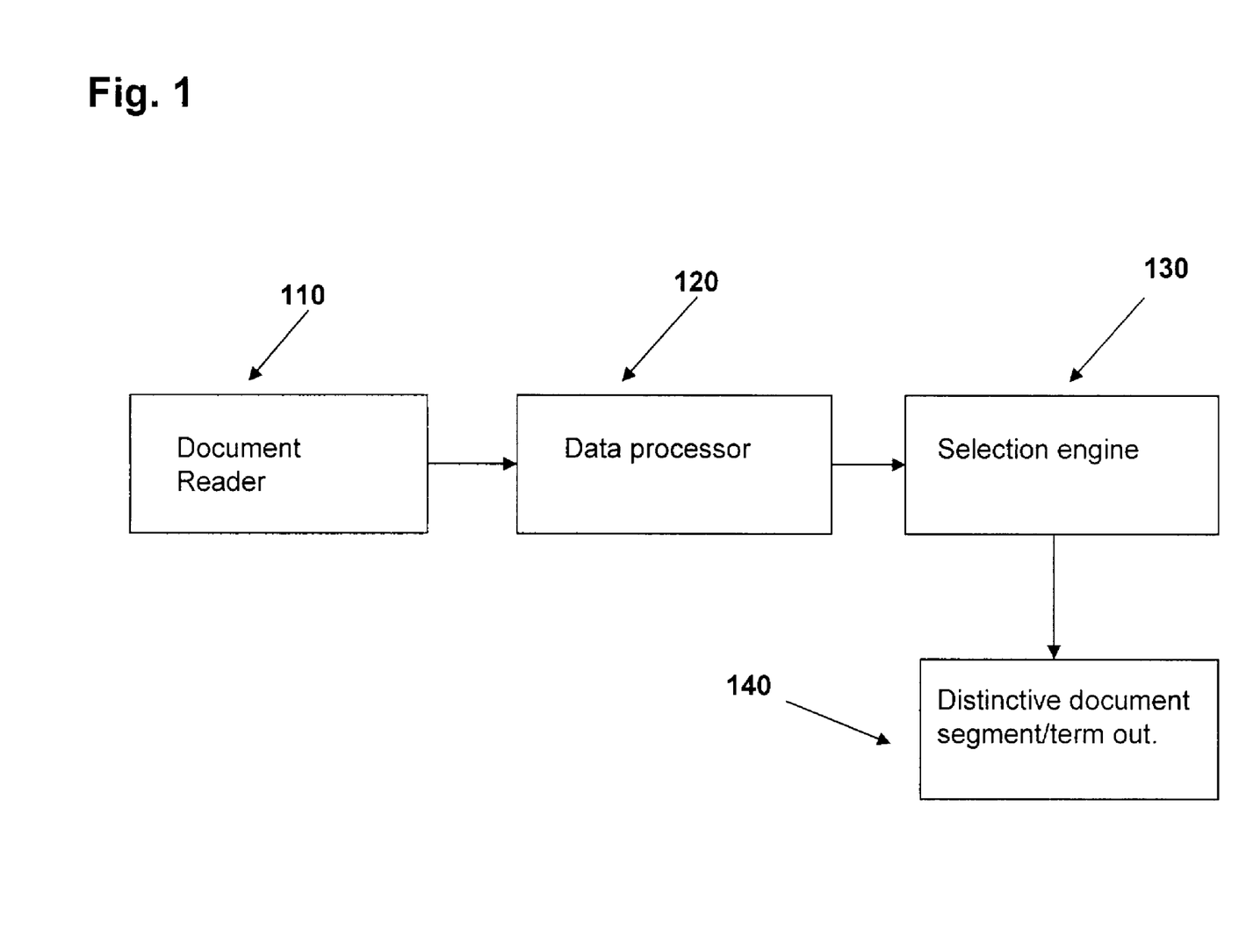
FIG. 1 is a block diagram of a computer including features of the present invention.

FIG. 1 is a block diagram of a computer including a document reader 110 for reading both a comparison document and a target document. A data processor 120 receives an output from the document reader 10 and performs term detection, morphological analysis, document segmentation, etc. of the inputted documents, etc. Processor 120 supplies the detected, analyzed, and segmented documents to a selection data processing block to a selection engine 130 and, which selects a document segment having a high degree of distinctiveness or a term having a high degree of distinctiveness from within the target document. The engine 130 replies the document segment selected to a device 140, for example, a computer display or printer, which outputs the selected distinctive document segment or distinctive term. The computer of FIG. 1 can be a general-purpose computer or a computer dedicated to perform the operations described in connection with FIGS. 2–5.

Figure 2:
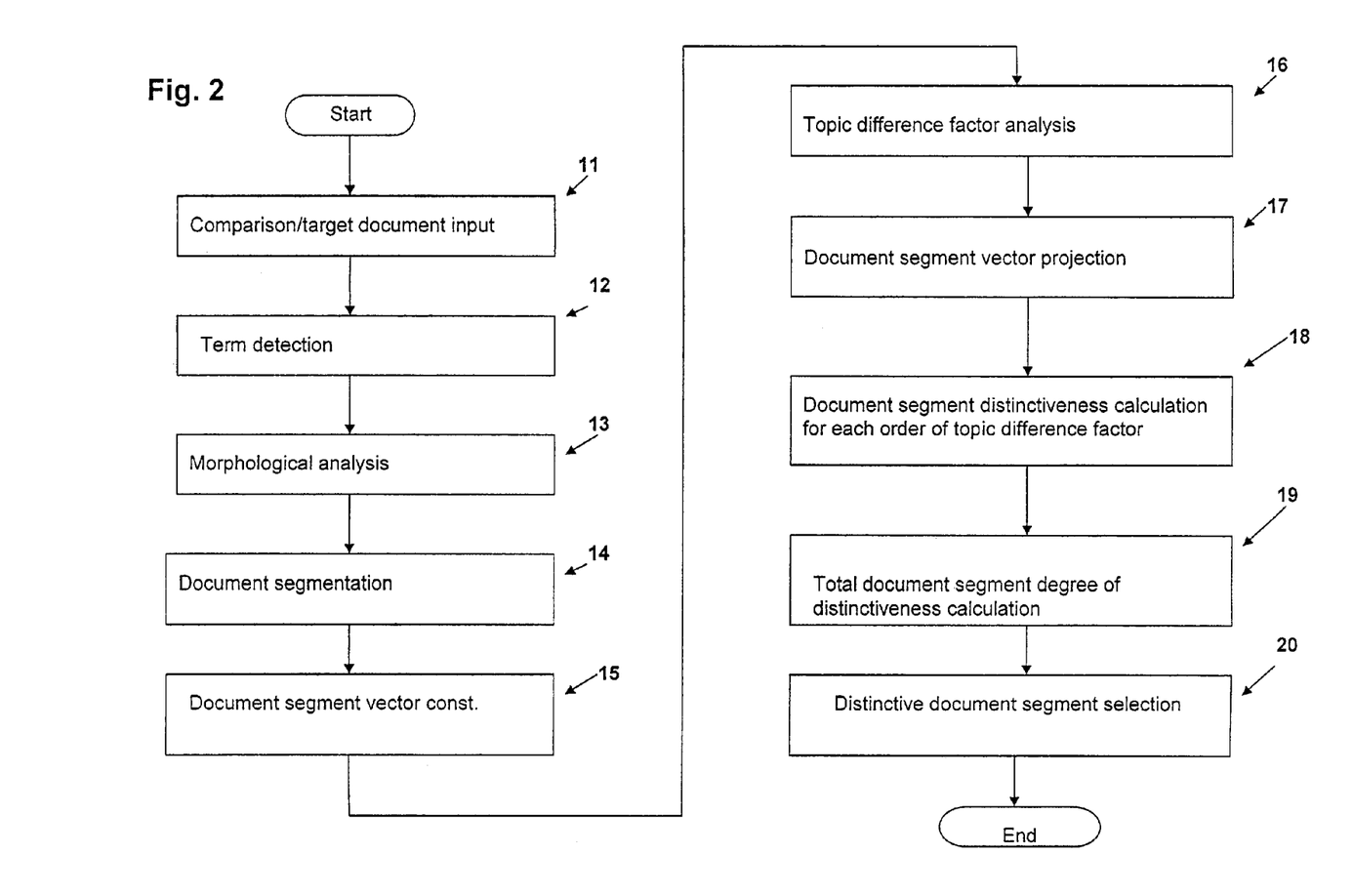
FIG. 2 is a flowchart of operations the computer described in connection with FIG. 1 performs in response to a program the computer stores in accordance with a first embodiment of the present invention; the flowchart includes steps from the time a document is read by the computer until the computer determines of a degree of distinctiveness of a document segment.

The following is a description of a method the computer of FIG. 1 performs in response to execution of a program which the computer stores to extract any document segment having a high degree of distinctiveness from within a target document. FIG. 2 is a flowchart of the operations the computer of FIG. 1 performs in sequence for evaluating the degree of distinctiveness of a document segment. This method can be practiced in such a way tat a program having the embodiment incorporated therein is run on a general-purpose computer. Referring to FIG. 2, numeral 11 designates a comparison/target document input step performed by the document reader 110, numeral 12 designates a term detection step performed by the data processor 120, numeral 13 designates a morphological analysis step, and numeral 14 designates a document segmentation step also performed byte data processor 120. Furthermore, numeral 15 designates a document segment vector construction step, numeral 16 designates a topic difference factor analysis step, numeral 17 designates a document segment vector projection step, numeral 18 designates a document segment distinctiveness calculation for each order of topic difference factor step, numeral 19 designates a total document segment distinctiveness degree calculation step. and numeral 20 designates a distinctive document segment selection step. Selection engine 130 performs each of steps 15–20. The following description of how the computer of FIG. 1 operates to perform the steps of Fig 2 uses English language documents as an example.

First, a target document and a comparison document are inputted in the comparison/target document input step 11. In the term detection step 12, processor 120 detects words, formulas, a series of symbols, etc. from both documents. Hereinafter, all of the words, the series of symbols, etc. are generically referred to as "terms". In the case of English language writing, the notation method wherein the terms are spaced apart has been established, so that the detection of the terms is easy. Subsequently, both comparison and target documents are morphologically analyzed in the morphological analysis step 13, for example, a tag indicating the part-of-speech is added to each term. In the document segmentation step 14, both documents are divided into document segments. The most fundamental unit of the document segments is a sentence. In case of the English language writing, a sentence is easily extracted since a sentence ends in a period, followed by a space. Other document segmentation methods include (1) separating a complex sentence into a principal clause and a subordinate clause, (2) collectively dividing a plurality of sentences into document segments so as to have a substantially equal number of terms, and (3) dividing a document, from the beginning thereof, into segments having the same number of terms, irrespective of sentences, and so forth.

In the document segment vector construction step 15, selection engine 130 determines (1) the number of components of a vector that is to be constructed from the terms occurring in the whole document and (2) the correspondence between the respective components and the individual terms. The components of the vector need not correspond to all the types of occurring terms, but rather the vector is constructed from only selected terms, for example, nouns and verbs, by utilizing the part-of-speech tagging results of step 13. In step 15, selection engine 130 constructs the document segment vector by obtaining the types of terms occurring in each document segment, and the frequencies thereof, and determines the values of the corresponding vector components by multiplying the frequencies by weights. The weights can be selected using known prior-art techniques.

Figure 5A:
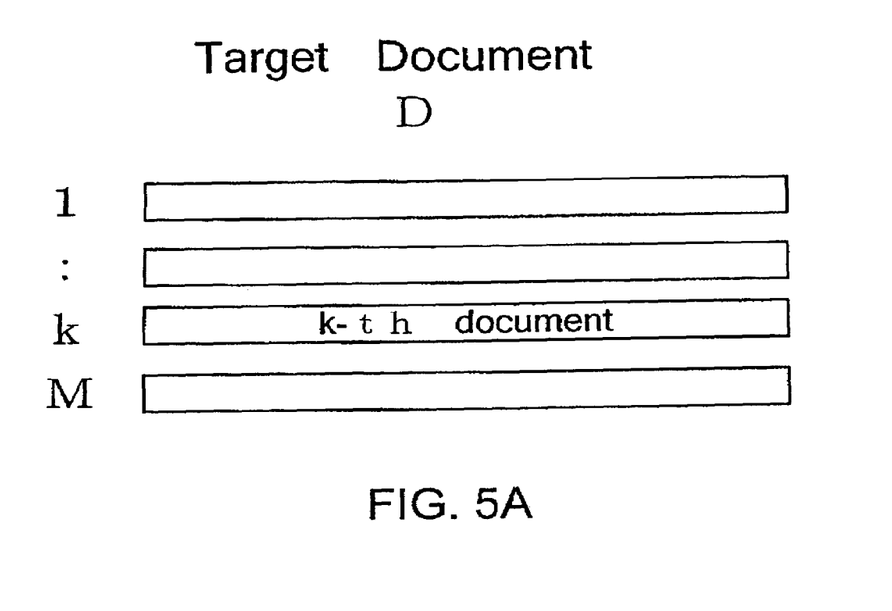
FIGS. 5A through 5D are diagrams helpful in describing how the computer of FIG. 1 is programmed to manipulate sentence vectors of a target document and a comparison document.
Figure 5B:
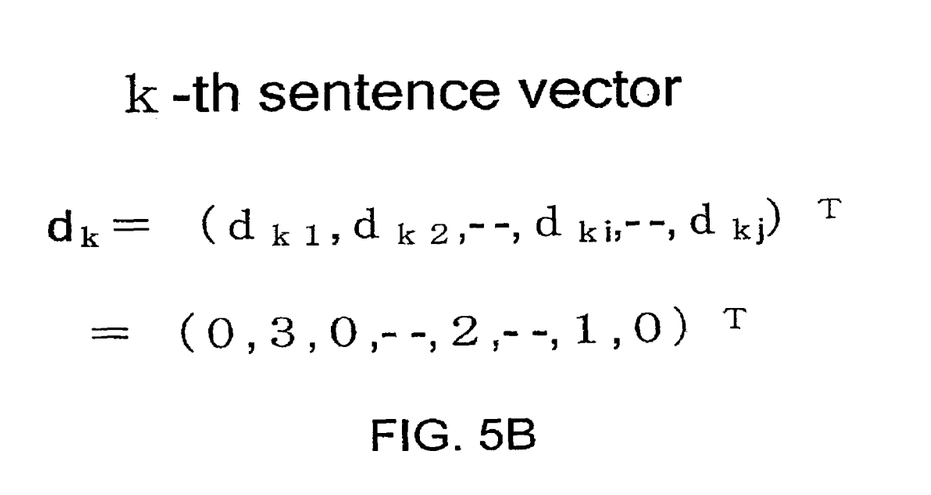
Figure 5C:
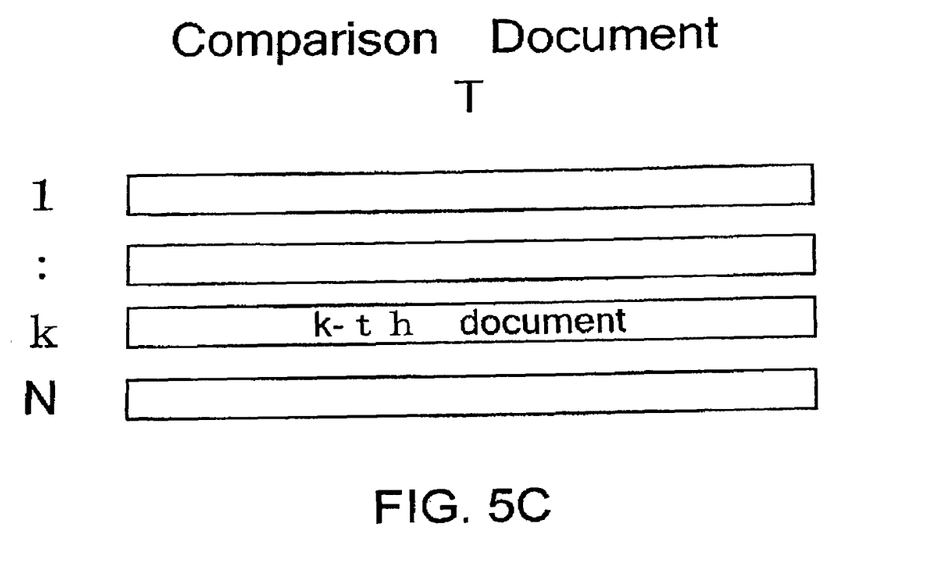
Figure 5D:
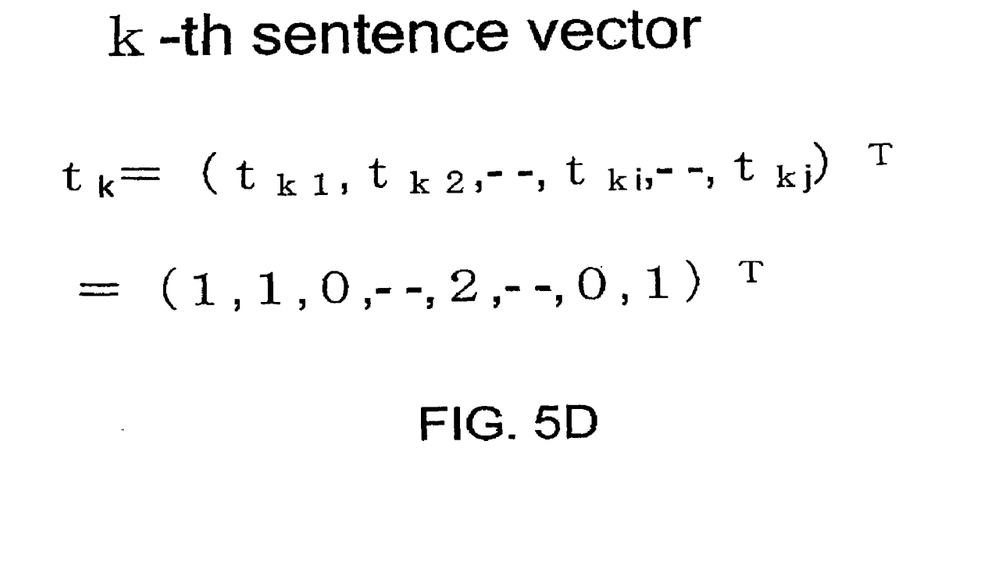

In the topic difference factor analysis step 16, selection engine 130 finds a projection axis that maximizes the ratio of the comparison and target documents by using the squared sums of the projected values of all the document segment vectors. Hereinafter, a sentence is assumed to be the document segment. Consider documents D and T for which the set of the occurring terms is given by $\{w_1, \ldots, w_J\}$, and which are respectively composed of M and N sentences. The document D is the target document, while the document T is the comparison document. The respective documents are represented by sets of sentence vectors, and the sentence vectors of the kth sentences of the respective documents are indicated by $d_k=(d_{k1}, \ldots, d_{kJ})^T$ and $t_k=(t_{k1}, \ldots, t_{kJ})^T$, where superscript T denotes a transposition of the vector. FIGS. 5A–5D show concept diagrams when the document segment is a sentence. The target document D is composed of M sentences (FIG. 5A), and the sentence vector $d_k$ is constructed from the kth sentence (FIG. 5B). The component of vector $d_k$ corresponding to the term $w_j$ is indicated as $d_{kj}$. Since the component $d_{kj}$ expresses the frequency of the term $w_j$ in the kth sentence, it takes each exemplified value. FIGS. 5C and 5D refer to the comparison document. Let symbol $\alpha$ denote a projection axis to be found. Assume that $\|\alpha\|=1$, where $\|\alpha\|$ denotes the norm of $\alpha$. Letting $P_D$ and $P_T$ denote the squared sums of the projected values when respectively projecting all of the sentence vectors of the documents D and T on the axis $\alpha$, the projection axis to be found is given as $\alpha$ which maximizes the ratio or criterion $J(\alpha)=P_D/P_T$. The squared sums $P_D$ and $P_T$ are expressed follows:

$$P_D = \sum_{k=1}^{M} (d_k^T \alpha)^2 = \alpha^T S_D \alpha, \quad \text{Equation 1}$$

-continued $$S_D = \sum_{k=1}^{M} d_k d_k^T x, \quad \text{Equation 2}$$

$$P_T = \sum_{k=1}^{N} (t_k^T \alpha)^2 = \alpha^T S_T \alpha, \quad \text{Equation 3}$$

$$S_T = \sum_{k=1}^{N} t_k t_k^T. \quad \text{Equation 4}$$

Therefore, the criterion $J(\alpha)$ can be written as:

$$J(\alpha) = \frac{P_D}{P_T} = \frac{\alpha^T S_D \alpha}{\alpha^T S_T \alpha}. \quad \text{Equation 5}$$

The axis $\alpha$ that maximizes the criterion $J(\alpha)$ given by Equation 5 can be obtained such that a value obtained by differentiating $J(\alpha)$ with respect to $\alpha$ is made equal to 0 (zero). This axis is given as the eigenvector of a generalized eigenvalue problem indicated by:

$$S_D \alpha = \lambda S_T \alpha. \quad \text{Equation 6}$$

These operations correspond to obtaining a projection axis which maximizes the ratio (squared sum of the projected values originating from the target document)/(squared sum of the projected values originating from the comparison document) when all of the sentence vectors of both documents are projected on a certain projection axis. Regarding such a projection axis, the squared sum of the projected values of the sentence vectors of the target document becomes large, whereas the squared sum of the projected values of the sentence vectors of the comparison document becomes small. Therefore, information that is prevalent in the target document and is not prevalent in the comparison document is reflected. In general, a plurality of values can be calculated as each of the eigenvalue and eigenvector of equation 6. The eigenvalue and eigenvector of ith order are respectively denoted by $\lambda_i$ and $\alpha_i$. The eigenvector of the ith order can be regarded as expressing an ith factor which reflects information existing in the target document D and not existing in the comparison target T. Accordingly, the eigenvector $\alpha_i$ of the ith order shall be called the "ith-order topic difference factor vector" of the target document D. Selection engine 130 calculates this topic difference factor vector in step 16 (topic difference factor analysis). Since $\lambda_i = \alpha_i^T S_D \alpha_i / \alpha_i^T S_T \alpha_i$, $\lambda_i$ is the value of the criterion when using $\alpha_i$.

Accordingly, the extents of the differences between both documents as reflected on the topic difference factor vectors of respective orders differ from one another. Therefore, the topic difference factor vectors of the respective orders are preferably weighted in accordance with the extents of the differences. The weighting is performed by determining the norm of the ith-order eigenvector $\alpha_i$ so as to become:

$$\alpha_i^T S_T \alpha_i = 1 \quad \text{Equation 7}$$

Then, $$\alpha_i^T S_D \alpha_i = \lambda_i \quad \text{Equation 8}$$

The squared sum of the inner products between the eigenvectors $\alpha_i$ and the respective sentence vectors of the target document D becomes equal to $\lambda_i$. In the case of Equation 6, a matrix $S_T$ must be a regular matrix in order for the eigenvector to be calculated. In actuality, however, the matrix $S_T$ cannot be obtained as a regular matrix when the number of sentences is smaller than the number of terms in the comparison document, or where specified terms co-occur in pairs at all times. In such a case, the eigenvector can be calculated by regularizing the matrix $S_T$ in conformity with the following equation:

$$\hat{S}_T = S_T + \beta^2 1 \qquad \text{Equation 9}$$

wherein $\beta^2$ denotes a parameter, and 1 denotes the identity matrix.

In the case of Equation 7, the criterion $J(\alpha)$ is equivalently reduced as follows:

$$j(\alpha) = P_D/(P_T + \beta^2). \qquad \text{Equation 10}$$

In step 17, during which the selection engine 130 determines the document segment vector projection, each sentence vector of the target document is projected on the topic difference factor vector of each order to calculate a corresponding projected value. The projected value of the sentence vector $d_k$ of the sentence k of the target document on the ith-order topic difference factor vector $\alpha_i$ is denoted by $y_{ki}$, and is calculated by the engine 130 using the following equation:

$$y_{ki} = \alpha_i^T d_k. \qquad \text{Equation 11}$$

Since, however, the projected value thus defined tends to become larger for a longer sentence, normalization of the projected value based on $\|d_k\|$ can be performed to make the projected value independent of the length of the sentence. In this case, the projected value $y_{ki}$ is given by:

$$y_{ki} = \alpha_i^T d_k / \|d_k\|. \qquad \text{Equation 12}$$

In step 18, engine 130 calculates the document segment distinctiveness for each order of the topic difference factor, the ith-order degree of distinctiveness $\text{distinc}(d_k, i)$ of the sentence vector $d_k$ is calculated on the basis of the projected value $y_k$. In general, the projected value $y_{ki}$ takes a plus or minus value. The absolute value of the projected value $y_{ki}$ increases as the content of the sentence k gets closer to that of the target document D and is more different from that of the comparison document T. Therefore, the distinctiveness degree $\text{distinc}(d_k, i)$ can be defined as:

$$\text{distinc}(d_k, i) = y_{ki}^2 \qquad \text{Equation 13}$$

or $$\text{distinc}(d_k, i) = |y_{ki}|. \qquad \text{Equation 14}$$

Engine 130 calculates the ith-order distinctiveness degree, indicated by Equation 13, using only the ith factor. Engine 130 calculates the degrees of distinctiveness based on a plurality of factors to accurately express the distinctiveness of the sentence k. For this purpose, engine 130 calculates, in step 19, the total document segment degree of distinctiveness of the sentence k in conformity with:

$$\text{distinc}(d_k) = \sum_{i=1}^{L} \text{distinc}(d_k, i). \qquad \text{Equation 15}$$

The variable L indicates the number of topic difference factor vectors used in the calculation of the sentence distinctiveness, and a suitable value must be experimentally determined. The maximum value of L is the number of eigenvalues whose values become equal to or greater than 1 (one).

In step 20 of the distinctive document segment selection, engine 130 selects any distinctive sentence in the target document on the basis of the degrees of distinctiveness of the respective orders and the total degree of distinctiveness as previously calculated. The selection proceeds as described below. In the simple method engine 130 selects any sentence having a total degree of distinctiveness equal to or above a predetermined value.

A more complex method employs the topic difference factor vector of a specified order. Engine 130 initially classifies individual sentences into a list group in which the projected values of the respective sentence vectors onto the topic difference factor vector become positive, and a second group in which they become negative. Subsequently, any sentences whose degrees of distinctiveness of each order are equal to or greater than the predetermined value are selected from the respective groups. These operations are executed for all the topic difference factor vectors up to the predetermined order L, and duplicate sentences are excluded, whereby the distinctive sentences are selected. The Engine 130 can select distinctive sentences by either the simple or complex method.

Moreover, according to the program of FIG. 2, not only the degrees of distinctiveness of the document segments, but also those of the combinations of terms, such as phrases, term groups under dependency relationships, or term series patterns, are evaluated as stated below. In, for example, an expression "game of soccer played at Yokohama", "of soccer" modifies the noun "game", and hence, "game of soccer" becomes a noun phrase. Further, "played at Yokohama" modifies the noun phrase "game of soccer", and hence, the above expression becomes a noun phrase as a whole. In more detail, "at Yokohama" modifies the verb "played", and hence, "played at Yokohama" becomes a term group under a dependency relationship. Besides, in a case where expressions "game of soccer played at xx" occur repeatedly as various place names are included as xx, "game of soccer played at" becomes a term series pattern.

In step 13, in addition to the execution of the morphological analysis, processor 120 extracts the combinations of terms to be evaluated. Phrases, or term groups under dependency relationships are extracted by executing a syntactic analysis. Various methods have already been devised for the extraction of term series patterns occurring frequently, and they can be employed without any problem. In step 15, a vector $p = (p_i, \ldots, p_j)^T$ is constructed for each combination of terms to-be-evaluated, in addition to the document segment vectors used in step 16. The vector p is a vector in which its components corresponding to terms contained in the combination of terms take a value "1", whereas its other components take a value "0". A practical example of the vector p is explained as follows. In the case of the expression "game of soccer played at Yokohama", the vector p becomes a vector in which only the components corresponding to terms "Yokohama", "played", "soccer" and "game" take a value "1", whereas the other components take a value "0". Using such a vector p instead of the sentence vector $d_k$ in steps 17, 18 and 19, engine 130 calculates the degrees of distinctiveness of the combination of terms to be evaluated. In step 20, accordingly, distinctive combinations of terms likewise selects the engine 130 in the distinctive sentences.

Figure 3:
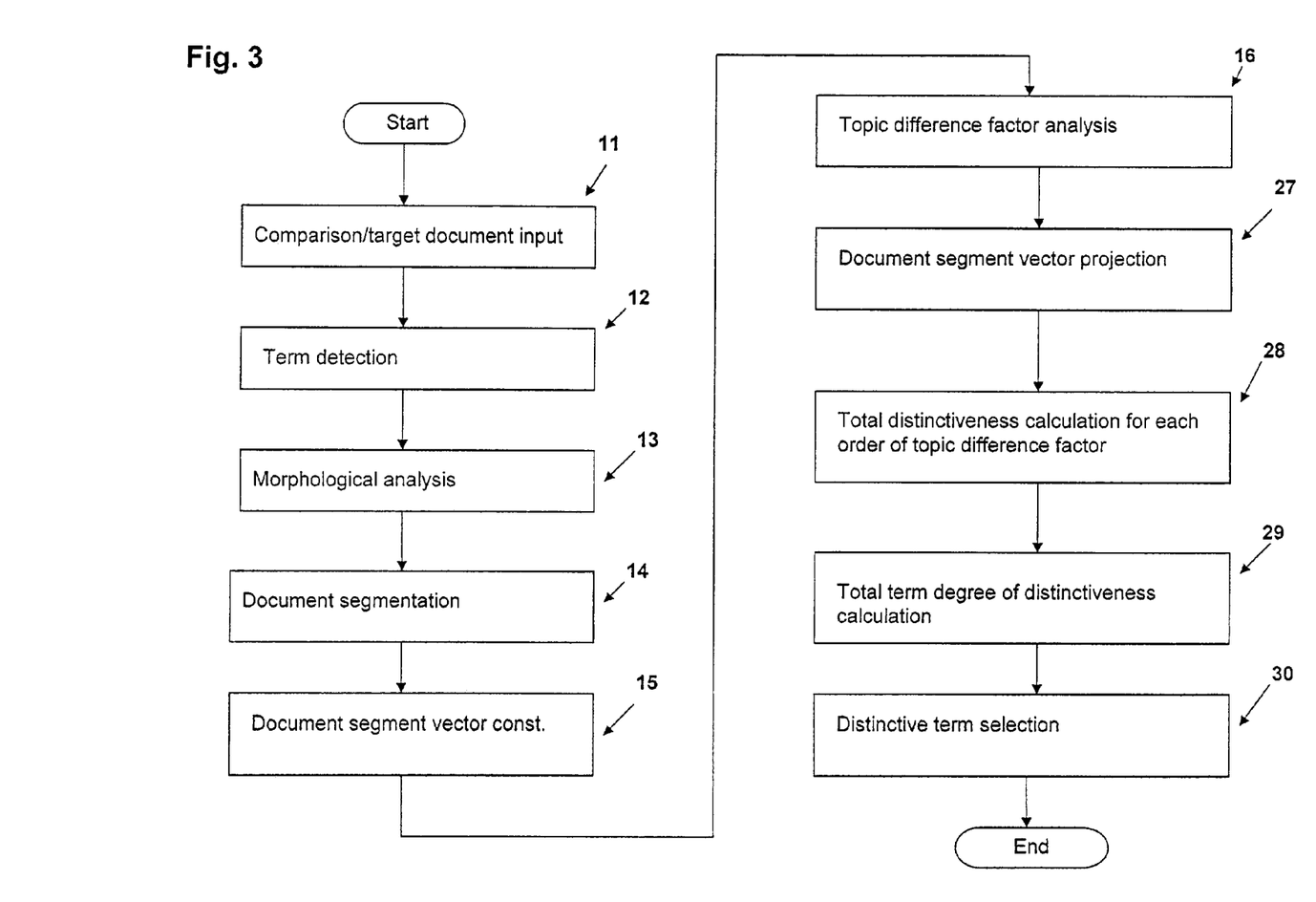
FIG. 3 is a flowchart of a second embodiment of computer operations in accordance with the present invention that flowchart includes steps from the time a document is read by the computer until the computer determines a degree of distinctiveness of a term.

As a second embodiment, there will be described a method of selecting any term having a high degree of distinctiveness from within a target document. Regarding terms, the correlations between the frequencies of a target term in individual sentences and the degrees of distinctiveness of the respective sentences are calculated, and any term having a high correlative value is selected. The degree of distinctiveness of the term is calculated on the basis of the correlative value. FIG. 3 is a flowchart of a second embodiment in accordance with the present invention for evaluating the degree of distinctiveness of a term. This method can be practiced in such a way that a program having the embodiment of the present invention contained therein is run on a general-purpose computer. Referring to the flowchart of FIG. 3, numeral 11 designates the step of comparison/target document input, numeral 12 designates the step of term detection, numeral 13 designates the step of morphological analysis, and numeral 14 designates the step of document segmentation. Furthermore, numeral 15 designates the step of document segment vector construction, and numeral 16 designates the step of topic difference factor analysis. Still furthermore, numeral 27 designates the step of document segment vector projection, numeral 28 designates the step of term degree of distinctiveness calculation for each order of topic difference factor, numeral 29 designates the step of total term degree of distinctiveness calculation, and numeral 30 designates the step of distinctive term selection. Among the above steps, elements 11–16 are the same as those shown in FIG. 2.

An example in which a document segment is assumed to be a sentence will be described as in the case of FIG. 2. At the document segment vector projection step 27, all the sentence vectors of the comparison document T are projected in addition to the projection of the sentence vector of the target document D in step 17 in FIG. 2. The projected value of the sentence vector $t_k$ of the comparison document T on the ith-order topic difference factor vector $\alpha_i$, denoted by $z_{ki}$ is calculated by:

$$z_{ki} = \alpha_i^T t_k \qquad \text{Equation 16}$$

or $$z_{ki} = \alpha_i^T t_k / \|t_k\|. \qquad \text{Equation 17}$$

In step 28 of the term degree of distinctiveness calculation for each order of topic difference factor, the correlation between the projected values of individual sentences and term frequencies in the respective sentences is first calculated. Here, correl($w_j$, i) denotes the correlation coefficient between the values of those components of sentence vectors in the target document and the comparison document which correspond to a jth term $w_j$ and the projected values of the respective sentence vectors on the ith-order topic difference factor vector $\alpha_i$. The jth components of the sentence vectors $d_k$ and $t_k$ are $d_{kj}$ and $t_{kj}$, and the projected values thereof on the vector $\alpha_i$ are $y_{ki}$ and $z_{ki}$, respectively, so that the correlation coefficient can be calculated by:

$$correl(w_j, i) = \frac{\left(\sum_{k=1}^{M} y_{ki} d_{kj} + \sum_{k=1}^{N} z_{ki} t_{kj}\right)}{\sqrt{\sum_{k=1}^{M} y_{ki}^2 + \sum_{k=1}^{N} z_{ki}^2} \sqrt{\sum_{k=1}^{M} d_{kj}^2 + \sum_{k=1}^{N} t_{kj}^2}}. \qquad \text{Equation 18}$$

The correlation coefficient increases for the term $w_j$ when a proportional relationship holds between the value of the component corresponding to the term $w_j$ in the sentence vector $d_k$ or $t_k$ and the projected value of the sentence vector on the topic difference factor vector $\alpha_i$. That is, the correlation coefficient increases when the ith-order degree of distinctiveness of the sentence becomes large when the term $w_j$ occurs and becomes small when the term $w_j$ does not occur. In such a case, the term $w_j$ can be regarded as a distinctive term that governs the ith-order degree of distinctiveness of each sentence. Accordingly, the term degree of distinctiveness of ith order denoted by distinc($w_j$, i) can be calculated in step 28 by:

$$\text{distinc}(w_j, i) = \text{correl}(w_j, i)^2 \qquad \text{Equation 19}$$

or $$\text{distinc}(w_j, i) = |\text{correl}(w_j, i)|. \qquad \text{Equation 20}$$

In step 29 of the total term degree of distinctiveness calculation, a total degree of distinctiveness for each term is calculated by combining a plurality of factors as in the case of FIG. 2. The total degree of distinctiveness of the term $w_j$ denoted by distinc($w_j$) can be calculated in step 29 by:

$$\text{distinc}(w_j) = \Sigma_{i=1}^{L} \text{distinc}(w_j, i). \qquad \text{Equation 21}$$

In step 30 of the distinctive term selection, any term distinctive in the target document is selected on the basis of the degrees of distinctiveness of the respective orders and the total degree of distinctiveness as have been calculated. The selection can proceed as stated below. The simplest method is a method in which any term having a total degree of distinctiveness equal to or greater than a predetermined value is selected. Also, the ensuing method is possible. First, as to the topic difference factor vector of specified order, individual terms are classified into a group in which the correlation coefficients between the projected values of the respective sentence vectors onto the topic difference factor vector and the frequencies of the respective terms become positive, and a group in which they become negative. Subsequently, any terms whose degrees of distinctiveness of each order are equal to or greater than the predetermined value are selected from the respective groups. These operations are executed for all the topic difference factor vectors up to the predetermined order L, and duplicate terms are excluded, whereby the distinctive terms are selected. The distinctive terms can be selected by either of the methods.

Moreover, according to the second embodiment in accordance with the present invention, not only the degrees of distinctiveness of the terms, but also those of the combinations of terms, such as phrases, term groups under dependency relationships, or term series patterns, can be evaluated as stated below. As in the first embodiment, in step 13, in addition to the execution of the morphological analysis, the combinations of terms to be evaluated are extracted. Phrases, or term groups under dependency relationships can be extracted by executing a syntactic analysis. Various methods have already been devised for the extraction of term series patterns occurring frequently, and they can be employed without any problem. In step 15, frequencies at which each combination of terms to-be-evaluated occurs in the respective document segments are calculated, in addition to the construction of the document segment vectors for use in step 16. Here, $P_{Dk}$ denotes the frequency in the sentence k of the target document D, and $P_{Tk}$ denotes the frequency in the sentence k of the comparison document T. The degree of distinctiveness of the combination of terms to be evaluated can be calculated instead of that of the term $w_j$ by replacing $d_{kj}$ with $P_{Dk}$ and by replacing $t_{ki}$ with $p_{Tk}$ in steps 28 and 29. As a result, in step 30, distinctive combinations of terms can be selected likewise to the distinctive terms.

Figure 4:
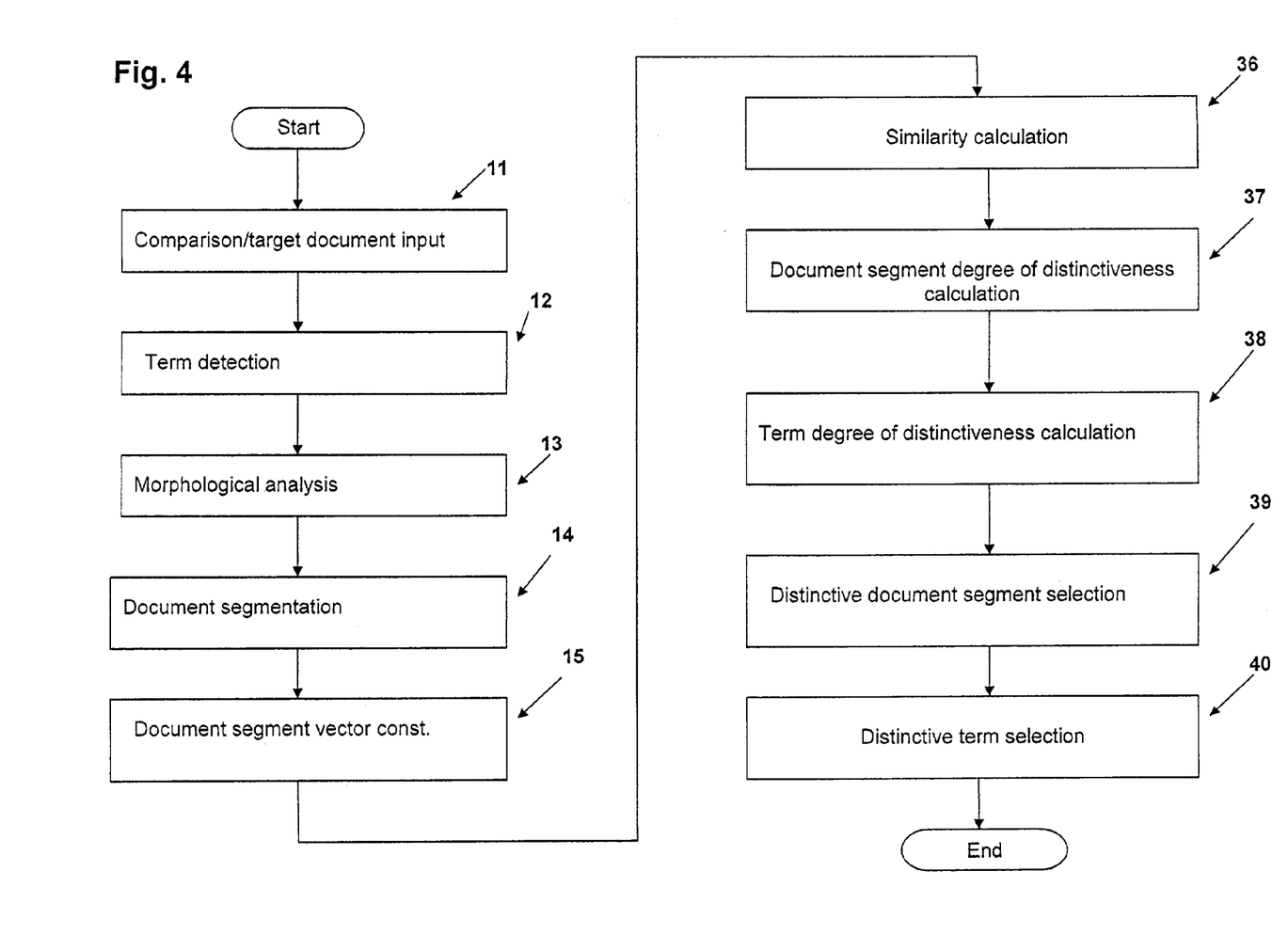
FIG. 4 is a flowchart of a third embodiment of computer operations in accordance with the present invention; the flowchart includes steps from the time a document is is read by the computer until the computer determines respective degrees of distinctiveness of a document segment and a term.

Next, in order to evaluate the distinctiveness of a target document, a third embodiment in accordance with the present invention operates as follows. The steps of comparison/target document input 11 through document segment vector construction 15 of the third embodiment are common to those of the first and second embodiments. Thereafter, a similarity to the whole target document and a similarity to the whole comparison document are calculated for each sentence of the target document. FIG. 4 is a flowchart showing the third embodiment of the present invention for evaluating the degrees of distinctiveness of a document segment and a term. This method can be practiced in such a way that a program having the embodiment contained therein is run on a general-purpose computer.

Referring to the flowchart of FIG. 4, numeral 11 designates the step of comparison/target document input, numeral 12 designates the step of term detection, numeral 13 designates the step of morphological analysis, and numeral 14 designates the step of document segmentation. Furthermore, numeral 15 designates the step of document segment vector construction, numeral 36 designates the step of similarity calculation, numeral 37 designates the step of document segment degree of distinctiveness calculation, and numeral 38 designates the step of term degree of distinctiveness degree. Still furthermore, numeral 39 designates the step of distinctive document segment selection, and numeral 40 designates the step of distinctive term selection. Steps 11–15 are the same as those shown in FIG. 2.

Engine 130, in similarity calculation step 36, calculates the similarities between the individual sentence vectors of the target/comparison documents and the whole target/comparison documents. Letting sim(D, $d_k$) denote the similarity of the sentence vector $d_k$ of the target document to the whole target document, and sim(T, $d_k$) denote the similarity thereof to the whole comparison document, sim(D, $d_k$) and sim(T, $d_k$) can be respectively calculated on the basis of the squared sums of the inner products between the sentence vector $d_k$ and all the sentence vectors of the target document and the comparison document, as follows:

$$sim(D, d_k) = \left( \frac{\sum_{m=1}^{M} (d_k^T d_m)^2}{\sqrt{\sum_{m=1}^{M} \sum_{n=1}^{M} (d_m^T d_n)^2} \, \|d_k\|^2} \right)^{1/2} \quad \text{Equation 22}$$

$$sim(T, d_k) = \left( \frac{\sum_{m=1}^{N} (d_k^T t_m)^2}{\sqrt{\sum_{m=1}^{N} \sum_{n=1}^{N} (t_m^T t_n)^2} \, \|d_k\|^2} \right)^{1/2}. \quad \text{Equation 23}$$

Alternatively, letting $\bar{d}$ and $\bar{t}$ denote the average sentence vectors of the target document and the comparison document, the above similarities can be respectively calculated as follows:

$$sim(D, d_k) = \frac{d_k^T \bar{d}}{\sqrt{(\bar{d}^T \bar{d})(d_k^T d_k)}}, \quad \text{Equation 24}$$

$$sim(T, d_k) = \frac{d_k^T \bar{t}}{\sqrt{(\bar{t}^T \bar{t})(d_k^T d_k)}}. \quad \text{Equation 25}$$

Incidentally, at the similarity calculation step 36, similarities to the whole target document and the whole comparison document are also calculated for all the sentence vectors of the comparison document in preparation for the term degree of distinctiveness calculation of step 38. In step 37 of document segment degree of distinctiveness calculation, engine 130 calculates degrees of distinctiveness for all of the sentence vectors of the target document. Any sentence that is important in the target document has a high similarity to the whole target document, and any sentence having a content that differs from that of the comparison document has a low similarity to the whole comparison document. Therefore, a degree of distinctiveness in which difference and importance are well balanced can be defined by employing a ratio (similarity to the whole target document)/(similarity to the whole comparison document). Accordingly, engine 130 in step 37 calculates the degree of distinctiveness distinc($d_k$) of the sentence k of the target document D as follows:

$$\text{distinc}(d_k) = \text{sim}(D, d_k)/\text{sim}(T, d_k). \quad \text{Equation 26}$$

The degree of distinctiveness of the sentence k thus calculated becomes large in a case where the sentence k has a high similarity to the target document and a low similarity to the comparison document. Incidentally, in step 37 of the document segment degree of distinctiveness calculation, the sentence degrees of distinctiveness of the comparison document T are also calculated in preparation for the next step 38 of the term distinctiveness calculation. The degree of distinctiveness of the sentence k of the comparison document T shall be denoted by distinc($t_k$).

In step 38, engine 130 performs the term degree of distinctiveness calculation from the correlation coefficients between the degrees of distinctiveness of individual sentences and term frequencies in the respective sentences. In step 38, engine 130 calculates the degree of distinctiveness of a term $w_j$ denoted by distinc($w_j$) in accordance with:

$$\text{distinc}(w_j) = \frac{\left( \sum_{k=1}^{M} d_{kj} \text{distinc}(d_k) + \sum_{k=1}^{N} t_{kj} \text{distinc}(t_k) \right)}{\sqrt{\sum_{k=1}^{M} d_{kj}^2 + \sum_{k=1}^{N} t_{kj}^2} \sqrt{\sum_{k=1}^{M} \text{distinc}(d_k)^2 + \sum_{k=1}^{N} \text{distinc}(t_k)^2}}. \quad \text{Equation 27}$$

The correlation coefficient becomes high for the term $w_j$ when a proportional relationship holds between the value of the component corresponding to the term $w_j$ in the sentence vector $d_k$ or $t_k$ and the degree of distinctiveness of the sentence. That is, the correlation coefficient increases when the degree of distinctiveness of the sentence becomes large when the term $w_j$ occurs and the degree of distinctiveness of the sentence becomes small when the term $w_j$ does not occur. In such a case, the term $w_j$ can be regarded as a distinctive term that governs the degree of distinctiveness of each sentence.

In steps 39 and 40, engine 130 selects the distinctive document segment and distinctive term, respectively such that any sentence whose degree of sentence distinctiveness is equal to or greater than a predetermined value, and any term whose term degree of distinctiveness is equal to or greater than a predetermined value are selected. Thereby, distinctive sentences and terms can be obtained.

According to FIG. 4, both the degrees of distinctiveness the document segments and the terms, but the degrees of distinctiveness of the combinations of terms, such as phrases, term groups under dependency relationships, or term series patterns, can be evaluated as stated below. In step 13, in addition to the execution of the morphological analysis, the combinations of terms to be evaluated are extracted. Phrases, or term groups under dependency relationships can be extracted by executing a syntactic analysis. Various methods have already been devised for the extraction of term series patterns occurring frequently, and they can be employed without any problem. In step 15, a vector $p=(p_i, \ldots, p_i)^T$ is constructed for each combination of terms to-be-evaluated, in addition to the document segment vectors for use in step 16. The vector p is a vector having components corresponding to terms contained in the combination of terms to be evaluated take a value "1", and having its other components take a value "0". Subsequently, in steps 36 and 37, the similarity sim(D, p) between such a vector p and the target document D and the similarity sim(T, p) between the vector p and the comparison document T are calculated by replacing the sentence vector $d_k$ with the vector p. As with equations 20 and 21, these similarities can be defined as follows:

$$sim(D, p) = \left( \frac{\sum_{m=1}^{M} (p^T d_m)^2}{\sqrt{\sum_{m=1}^{M} \sum_{n=1}^{M} (d_m^T d_n)^2} \|p\|^2} \right)^{1/2},$$ Equation 28

$$sim(T, p) = \left( \frac{\sum_{m=1}^{N} (p^T t_m)^2}{\sqrt{\sum_{m=1}^{N} \sum_{n=1}^{N} (t_m^T t_n)^2} \|p\|^2} \right)^{1/2}.$$ Equation 29

Alternatively, as with equations 22 and 23, the similarities may well be defined as follows:

$$sim(D, p) = \frac{p^T \bar{d}}{\sqrt{(\bar{d}^T \bar{d})(p^T p)}},$$ Equation 30

$$sim(T, p) = \frac{p^T \bar{t}}{\sqrt{(\bar{t}^T \bar{t})(p^T p)}}.$$ Equation 31

Using the similarities, the degree of distinctiveness of the combination of terms to be evaluated can be calculated as follows:

distinc(p)=sim(D, p)/sim(T,p). Equation 32

In step 40, those combinations of terms whose degrees of distinctiveness are equal to or greater than a predetermined value are selected as distinctive combinations of terms.

Furthermore, in this embodiment, the degrees of distinctiveness of phrases, term groups under dependency relationships, or term series patterns each composed of a plurality of terms can be calculated as stated below. In step 15, frequencies at which each combination of terms to-be-evaluated occurs in the respective document segments are calculated, in addition to the construction of the document segment vectors for use in step 16. Here, $P_{Dk}$ denotes the frequency in the sentence k of the target document D, and $P_{tk}$ denotes the frequency in the sentence k of the comparison document T. The degree of distinctiveness of the combination of terms to be evaluated can be calculated instead of the degree of distinctiveness of the term $w_j$ by replacing $d_{ki}$ with $P_{Dk}$ and by replacing $t_{ki}$ with $P_{Tk}$ in step 38. In step 39, those combinations of terms whose degrees of distinctiveness are equal to or greater than a predetermined value are selected as distinctive combinations of terms.

The results of an experiment utilizing equation 13 follow in order to set for the certain features of the present invention. As data used in the experiment, two documents were selected under the criteria of suitable lengths and a high similarity from the first category "acq" of a text-categorizing corpus "Reuters-21578". The "id"s of these documents were 1836 and 2375. The cosine similarity between the documents was 0.955. The document 1836 was composed of 43 sentences, while the document 2375 was composed of 32 sentences. The documents were news items on an identical day. The document 2375 thought to have been sent later was set as the target document D, and the document 1836 as the comparison document T, so as to extract distinctive sentences, etc. from the target document D. The contents of the documents relate to the takeover of a US aviation company "USAir" by a US aviation company "TWA". Sentences D-1 through D-4 summarize news, sentences D-5 through D-24 state the details of a takeover drama, and sentences D-25 et seq. state an analysis about the company "TWA". Many information items which are not existent in the document T are contained in some of the sentences D-1 through D-4 and D-5 through D-24, and in the sentences D-25 et seq. The whole texts of the documents will be indicated as "experimental document data" at the end of this specification.

The experiment was conducted in accordance with the first embodiment of the present invention. As a result, eight sentences D-1, D-8, D-11, D-24, D-25, D-27, D-28 and D-30 were selected as sentences of high degrees of distinctiveness. Also in a human reading comparison experiment, these sentences were recognized as sentences that were weakly related to the comparison document and which were distinctive in the target document.

The results obtained by selecting words of high degrees of distinctiveness in accordance with equation 19 are listed below. For each of the ten words having the high degrees of distinctiveness, the degree of distinctiveness of the word, the occurring frequency thereof in the target document D, and the occurring frequency thereof in the comparison document T is indicated.

| Selected Word | Degree of Distinctiveness | Occurring Frequency In Target Document D | Occurring Frequency In Comparison Document T |
| --- | --- | --- | --- |
| succeed | 85.7 | 3 | 0 |
| work | 85.3 | 2 | 0 |
| cost | 85.2 | 2 | 0 |
| surviving | 81.6 | 2 | 0 |
| clear | 80.4 | 3 | 0 |
| company | 71.0 | 5 | 1 |

-continued

| Selected Word | Degree of Distinctiveness | Occurring Frequency In Target Document D | Occurring Frequency In Comparison Document T |
| --- | --- | --- | --- |
| fall | 67.3 | 2 | 0 |
| arbitrager | 67.0 | 5 | 1 |
| bid | 62.4 | 5 | 1 |
| merge | 61.9 | 3 | 1 |

In view of these results, the words whose occurring frequencies were low in the comparison document T and high in the target document D could be selected.

As an application of such an experiment, the ensuing example is considered. When a certain news item was read earlier to grasp its content, any key word whose content is not stated in the earlier news item can be extracted from a news item that arrived later. Accordingly, a determination can be made as to whether the later news item needs to be read in detail. Different degrees of distinctiveness can be obtained even for two terms, such as the words "succeed" and "clear" mentioned above, which have quite the same frequencies in the target document and in the comparison document, and which is more distinctive can be judged as the merit of the present invention.

Experimental Document Data

The documents used in the present invention are stated below

Comparison Document T (Reuter-id 1836)

Trans World Airlines Inc complicated the bidding for Piedmont Aviation Inc by offering either to buy Piedmont suitor USAir Group or, alternatively, to merge with Piedmont and USAir. Piedmont's board was meeting today, and Wall Street speculated the board was discussing opposing bids from Norfolk Southern Corp and USAir. The TWA offer was announced shortly after the Piedmont board meeting was scheduled to begin. TWA offered to buy USAir for 52 dlrs cash per share. It also said it was the largest shareholder of USAir and threatened to go directly to USAir shareholders with an offer for 51 pct of the stock at a lower price. TWA also said it believed its offer was a better deal for USAir shareholders than an acquisition of Piedmont, but it said it alternatively would discuss a three way combination of the airlines. Market sources and analysts speculated that TWA chairman Carl Icahn made the offer in order to put his own airline into the takeover arena. We're just wondering if he's not just trying to get TWA into play.

There's speculation on the street he just wants to move onto something else, said one arbitrager. We think TWA might just be putting up a trial balloon. Analysts said the offer must be taken seriously by USAir, but that the airline will probably reject it because the price is relatively low compared to other airline deals. They also said Icahn must prove his offer credible by revealing financing arrangements. They need to show their commitment and their ability to finance. I think it's a credible offer, said Timothy Pettee, a Bear Stearns analyst. I think it's certainly on the low end of relative values of airline deals, said Pettee. Pettee estimated 58 dlrs would be in a more reasonable range based on other airline mergers. USAir stock soared after TWA made public its offer.

A spokesman for USAir declined comment, and said USAir had not changed its offer for Piedmont. USAir offered of buy 50 pct of that airline's stock for 71 dlrs cash per share and the balance for 73 dlrs per share in USAir stock. USAir closed up 5-⅜ at 49-⅛ on volume of 1.9 mln shares. Piedmont, which slipped ½ to close at 69-⅝, also remained silent on the TWA action. Piedmont has an outstanding 65 dlr cash per share offer from Norfolk Southern Corp. Norfolk Southern declined comment, but said it stuck with its offer for Piedmont. Norfolk owns about 20 pct of Piedmont and opened the bidding when it said it would propose a takeover of Piedmont. Some analysts said Icahn may be trying to acquire USAir to make his own airline a more attractive takeover target. Icahn I think had wanted to sell his airline and there were no takers. I think the strategy might have called for making his investment more attractive.

One way to accomplish that specific objective is to go out and acquire other airlines, said Andrew Kin of Eberstadt Fleming. I don't know whose going to buy them, but at least this way it becomes a much more viable package, said Kim. But Icahn's financing ability for such a transaction remains in doubt, in part because of TWA's heavy debt load. Wall street sources said TWA has some cash with which to do the offer. The sources said Icahn has not lined up outside financial advisers and plans to make his own arrangements. Icahn earlier this year abandoned plans to buy USX Corp <X> and still retains 11 pct of that company's stock. Some Wall street sources said the financier's USX plan was impacted by the cloud hanging over his adviser, Drexel Burnham Lambert Inc, because of Wall Street's insider trading scandal. Industry sources also predicted USAir might reject the TWA offer on price and financing concerns. It's littered with contingencies and it doesn't even have a financing arrangement, said one executive at another major airline. But the executive conceded a merged TWA USAir would be a strong contender with USAir's east coast route system and planned west coast presence from PSA. USAir could feed the international flights of TWA, which has a midwest presence in its St. Louis hub. Adding Piedmont, dominant in the southeast, to the mix would develop an even stronger force. The combined entity would also have TWA's pars reservation system. Such a merger would be complex and analysts said it would result in an airline iwth an 18 pct market share.

Target Document D (Reuter-id2375)

D-1 Carl Icahn's bold takeover bid for USAir Group <U> has clouded the fate of Piedmont Aviation Inc, which was being courted by USAir.

D-2 Yesterday, Icahn's Transworld Airlines Inc <TWA> made a 1.4 billion dlr offer for USAir Group.

D-3 The move complicated a USAir takeover offer for Piedmont, which was believed to be close to accepting the bid.

D-4 Today, USAir rejected Icahn's 52 dlr per share offer and said the bid was a last minute effort to interfere in its takeover of Piedmont.

D-5 Icahn was unavailable for comment.

D-6 Piedmont fell one to 68-⅝ on volume of 963,000.

D-7 TWA was off ⅜ to 31-½.

D-8 USAir fell 1-⅜ to 47-¾ as doubt spread it would be taken over.

D-9 Analysts and market sources view the TWA bid as an attempt to either trigger a counter offer from USAir or to attract a suitor who might want both airlines once they merged.

D-10 The next move is either Icahn starts a tender offer or Piedmont and USAir announce a deal, speculated one arbitrager.

D-11 Some arbitragers said there is now some risk in the current price of Piedmont since it is not clear that USAir's bid will succeed.

D-12 Piedmont's largest shareholder and other suitor, Norfolk Southern Corp <NSC> has offered 65 dlrs per share for the company.

D-13 USAir offered 71 dlrs cash per share for half of Piedmont stock, and 73 dlrs per share in stock for the balance.

D-14 Some arbitragers, however, believe the depressed price of Piedmont offers a buying opportunity since the airline is destined to be acquired by someone.

D-15 USAir, they said, is the least likely to be bought.

D-16 Icahn, who has long talked about further consolidation in the airline industry, also offered USAir the alternative of a three way airline combination, including TWA and Piedmont.

D-17 But Wall Street has given little credibility to Icahn's offer, which lacked financing and was riddled with contingencies.

D-18 Still, he has succeeded in holding up a merger of two airlines both of which analysts said would fit well with TWA.

D-19 You can't discount him, said one arbitrager.

D-20 Analysts, however, said Icahn would have to prove he is serious by following through with his threats or making a new offer.

D-21 In making the offer for USAir, Icahn threatened to go directly to shareholders for 51 pct of the stock at a lower price if USAir rejected his offer.

D-22 It's clear Icahn wants to sell and he's bluffing, said one arbitrager.

D-23 Analysts said the 52 dlr per share offer was underpriced by about six dlrs per share.

D-24 Some analysts believe Icahn's proposed three way airline combination might face insurmountable regulatory hurdles, but others believe it could be cleared if the companies are acquired separately.

D-25 TWA would have to be the surviving company for the deal to work, said one analyst.

D-26 Analysts said such a merger would be costly and complicated.

D-27 TWA has the best cost structure, since Icahn succeeded in winning concessions from its unions.

D-28 In order for the other carriers to come down to TWA's wage scale in a merger, TWA would have to be the surviving entity, analysts said.

D-29 Such a move does not necessarily free Icahn of TWA, they said.

D-30 They said he showed skill in reducing Ozark Airlines' costs when he merged it into TWA last year, and he might be a necessary ingredient for a merger to work.

D-31 However, other analysts speculated the managements of Piedmont and USAir would not tolerate Icahn as head of a new company.

D-32 They said a USAir acquisition of TWA might be a way for him to exit the company if USAir's airline is then merged into TWA.

What is claimed is:

1. A method of evaluating a degree of distinctiveness of each term contained in a target document including at least one document segment with respect to a comparison document including at least one document segment, the method comprising:

(a) identifying a respective document segment vector for each document segment contained in the comparison document and the target document, each document segment vector having component values associated with occurring frequencies of terms occurring in the document segment;

(b) from the document segment vectors, computing squared sum matrices respectively corresponding to the comparison document and the target document;

(c) computing a predetermined number of orders of topic difference factor vectors of the target document from the squared sum matrices respectively corresponding to the comparison document and the target document;

(d) computing values of inner products for each of said document segments of the target document and the comparison document, the values of inner products being calculated between the corresponding document segment vector and the topic difference factor vectors of the respective orders;

(e) computing degrees of distinctiveness of said respective orders and a total degree of distinctiveness for each term contained in the target document, on the basis of correlation coefficients between frequencies of each term in the respective document segments and the values of the inner products; and (f) transmitting an output to a device wherein the output comprises the computed degrees of distinctiveness of at least one of said respective orders and a total degree of distinctiveness for each term contained in the target document.

2. The method of 1, wherein the transmitting an output to a device comprises transmitting the output to at least one of a computer display and a printer.

3. A method of evaluating a degree of distinctiveness of each combination of terms contained in a target document including at least one document segment with respect to a comparison document including at least one document segment, the method comprising:

(a) identifying a respective document segment vector for each document segment contained in the comparison document and the target document, each document segment having component values associated with occurring frequencies of terms occurring in the document segment;

(b) from the document segment vectors, computing squared sum matrices respectively corresponding to the comparison document and the target document;

(c) computing a predetermined number of orders of topic difference factor vectors of the target document from the squared sum matrices respectively corresponding to the comparison document and the target document;

(d) computing values of inner products for each of said document segments of the target document and the comparison document, said values of inner products being calculated between the corresponding document segment vector and the topic difference factor vectors of the respective orders;

(e) computing degrees of distinctiveness of said respective orders and a total degree of distinctiveness for each combination of terms contained in the target document, on the basis of correlation coefficients between frequencies of each combination of terms in the respective document segments and the values of the inner products; and (f) transmitting an output to a device wherein the output comprises the computed degrees of distinctiveness of at least one of said respective orders and a total degree of distinctiveness for each combination of terms contained in the target document.

4. The method of 3, wherein the transmitting an output to a device comprises transmitting the output to at least one of a computer display and a printer.

5. A method of evaluating a degree of distinctiveness of each term contained in a target document including at least one document segment with respect to a comparison document including at least one document segment, and identifying a distinctive term, the method comprising:

(a) identifying a respective document segment vector for each document segment contained in the comparison document and the target document, each document segment vector having component values associated with occurring frequencies of terms occurring in the document segment;

(b) from the document segment vectors, computing squared sum matrices respectively corresponding to the comparison document and the target document;

(c) computing a predetermined number of orders of topic difference factor vectors of the target document from the squared sum matrices respectively corresponding to the comparison document and the target document;

(d) computing values of inner products for each of said document segments of the target document and the comparison document, the values of inner products being calculated between the corresponding document segment vector and the topic difference factor vectors of the respective orders;

(e) computing degrees of distinctiveness of said respective orders and a total degree of distinctiveness for each term contained in the target document, on the basis of correlation coefficients between frequencies of each term in the respective document segments and the values of the inner products;

(f) identifying a distinctive combination of terms in the target document, on the basis of the degrees of distinctiveness of said respective orders or the total degree of distinctiveness thereof; and (g) transmitting an output to a device wherein the output comprises the identified distinctive combination of terms in the target document.

6. The method of claim 5, further comprising: computing the squared sum matrix of the target document by defining J as a larger one of the numbers of types of terms occurring in the target document and the comparison document, defining M as the number of document segments in the target document, and defining a kth document segment vector to be $d_k = (d_{k1}, \ldots, d_{kJ})^T (k=1, \ldots, M)$ where T denotes a transposition of the vector, and $d_{kj}$ denotes the value associated with the occurring frequency of a jth term occurring in the document segment, and computing the squared sum matrix of the target document by the following equation:

$$S_D = \sum_{k=1}^{M} d_k d_k^T, \text{ and}$$

computing the squared sum matrix of the comparison document by defining N as the number of document segments in said comparison document, and defining an nth document segment vector to be $t_k = (t_{k1}, \ldots, t_{kJ})^T (k=1, \ldots, N)$ where T denotes a transposition of the vector, and $t_{kj}$ denotes the value associated with the occurring frequency of a jth term occurring in said document segment, and then computing the squared sum matrix of the comparison document by the following equation:

$$S_T = \sum_{k=1}^{N} t_k t_k^T.$$

7. The method of claim 6, further comprising computing the degree of distinctiveness of each order for each term contained in the target document by one of an absolute value or a squared value of the correlation coefficients between the frequencies of each term in the respective document segments and the inner product values of the corresponding document segment vector and the topic difference factor vectors of the respective orders, and computing said total degree of distinctiveness by adding a predetermined number of degrees of distinctiveness of the respective orders.

8. The method of claim 5, further comprising computing an ith-order topic difference factor vector of the target document in accordance with an ith-order eigenvector $\alpha_i$ of a generalized eigenvalue in accordance with the following equation:

$$S_D \alpha = \lambda S_T \alpha.$$

9. The method of claim 8, further comprising computing the degree of distinctiveness of each order for each term contained in the target document by one of an absolute value or a squared value of the correlation coefficients between the frequencies of each term in the respective document segments and the inner product values of the corresponding document segment vector and the topic difference factor vectors of the respective orders, and computing said total degree of distinctiveness by adding a predetermined number of degrees of distinctiveness of the respective orders.

10. The method of claim 5, further comprising computing the degree of distinctiveness of each order for each term contained in the target document by one of an absolute value or a squared value of the correlation coefficients between the frequencies of each term in the respective document segments and the inner product values of the corresponding document segment vector and the topic difference factor vectors of the respective orders, and computing said total degree of distinctiveness by adding a predetermined number of degrees of distinctiveness of the respective orders.

11. The method of claim 5, wherein the transmitting an output to a device comprises transmitting the output to at least one of a computer display and a printer.

12. A method of evaluating a degree of distinctiveness of each combination of terms contained in a target document including at least one document segment with respect to a comparison document including at least one document segment, and identifying a distinctive combination of terms, the method comprising:

(a) identifying a respective document segment vector for each document segment contained in the comparison document and the target document, each document segment having component values associated with occurring frequencies of terms occurring in the document segment;

(b) from the document segment vectors, computing squared sum matrices respectively corresponding to the comparison document and the target document;

(c) computing a predetermined number of orders of topic difference factor vectors of the target document from the squared sum matrices respectively corresponding to the comparison document and the target document;

(d) computing values of inner products for each of said document segments of the target document and the comparison document, said values of inner products being calculated between the corresponding document segment vector and the topic difference factor vectors of the respective orders;
(e) computing degrees of distinctiveness of said respective orders and a total degree of distinctiveness for each combination of terms contained in the target document, on the basis of correlation coefficients between frequencies of each combination of terms in the respective document segments and the values of the inner products;
(f) identifying a distinctive combination of terms in the target document, on the basis of the degrees of distinctiveness of said respective orders or the total degree of distinctiveness thereof; and
(g) transmitting an output to a device wherein the output comprises the identified distinctive combination of terms in the target document.

13. The method of claim 12, further comprising computing the squared sum matrix of the target document by defining J as a larger one of the numbers of types of terms occurring in the target document and the comparison document, defining M as the number of document segments in the target document, and defining a kth document segment vector to be $d_k=(d_{k1}, \ldots, d_{kJ})^T$ ($k=1, \ldots, M$) where T denotes a transposition of the vector, and $d_{kj}$ denotes the value associated with the occurring frequency of a jth term occurring in said document segment, and then computing the squared sum matrix of the target document by the following equation:

$$S_D = \sum_{k=1}^{M} d_k d_k^T, \text{ and}$$

computing the squared sum matrix of the comparison document by defining N as the number of document segments in the comparison document, and defining an nth document segment vector to be $t_k=(t_{k1}, \ldots, t_{kJ})^T$ ($k=1, \ldots, N$) where T denotes a transposition of the vector, and $t_{kj}$ denotes the value associated with the occurring frequency of a jth term occurring in said document segment, and then computing the squared sum matrix of the comparison document in accordance with the following equation:

$$S_T = \sum_{k=1}^{N} t_k t_k^T.$$

14. The method of claim 13, further comprising computing an ith-order topic difference factor vector of the target document in accordance with an ith-order eigenvector $\alpha_i$ of a generalized eigenvalue in accordance with the following equation:

$$S_D \alpha = \lambda S_T \alpha.$$

15. The method of claim 14, further comprising computing the degree of distinctiveness of each order for each combination of terms contained in the target document by one of an absolute value or a squared value of the correlation coefficients between the frequencies of each combination of terms in the respective document segments and values of the inner products, and computing said total degree of distinctiveness by adding a predetermined number of degrees of distinctiveness of the respective orders.

16. The method of claim 13, further comprising computing the degree of distinctiveness of each order for each combination of terms contained in the target document by one of an absolute value or a squared value of the correlation coefficients between the frequencies of each combination of terms in the respective document segments and values of the inner products, and computing said total degree of distinctiveness by adding a predetermined number of degrees of distinctiveness of the respective orders.

17. The method of claim 12, further comprising computing the degree of distinctiveness of each order for each combination of terms contained in the target document by one of an absolute value or a squared value of the correlation coefficients between the frequencies of each combination of terms in the respective document segments and values of the inner products, and computing said total degree of distinctiveness by adding a predetermined number of degrees of distinctiveness of the respective orders.

18. The method of claim 12, wherein the transmitting an output to a device comprises transmitting the output to at least one of a computer display and a printer.

* * * * *